United States Patent
Shimada

[11] Patent Number: 6,049,053
[45] Date of Patent: Apr. 11, 2000

[54] APPARATUS FOR LOOSENING ELECTRODE TIP FOR SPOT WELDING

[76] Inventor: Toshiaki Shimada, 2-41-2 Kawauchi Asaminami-ku, Hiroshima, Japan

[21] Appl. No.: 09/103,104

[22] Filed: Jun. 23, 1998

[30] Foreign Application Priority Data

Jun. 27, 1997 [JP] Japan ................................. 9-187871
May 22, 1998 [JP] Japan ................................ 10-141194

[51] Int. Cl.[7] ............................... B23K 9/24; B23K 9/28
[52] U.S. Cl. ..................................... 219/86.1; 219/868
[58] Field of Search ............................... 219/86.1, 86.8, 219/86.25

[56] References Cited

U.S. PATENT DOCUMENTS

| | | | |
|---|---|---|---|
| 4,794,221 | 12/1988 | Takabe et al. ........................ | 219/86.8 |
| 4,910,373 | 3/1990 | Fuse ..................................... | 219/86.25 |
| 4,935,595 | 6/1990 | Fuse ..................................... | 219/86.25 |
| 5,073,692 | 12/1991 | Jackson et al. ....................... | 219/86.8 |
| 5,734,141 | 3/1998 | Voilmy et al. ....................... | 219/86.25 |
| 5,767,474 | 6/1998 | Shimada .............................. | 219/86.8 |

Primary Examiner—Patrick Ryan
Assistant Examiner—Anjan Dey
Attorney, Agent, or Firm—Jordan & Hamburg LLP

[57] ABSTRACT

The present invention provides an apparatus for loosening an electrode tip. The apparatus includes a clamping means mounted to a casing for clamping the electrode tip, the clamping means defining a through-hole for receiving the electrode tip to be loosened, and a driving means for driving the clamping means to allow the through-hole to expand and contract, thereby timely clamping and loosening the electrode tip positioned within the through-hole.

13 Claims, 11 Drawing Sheets

APPARATUS FOR LOOSENING ELECTRODE TIP FOR SPOT WELDING

BACKGROUND OF THE INVENTION

1. Field of the Invention

The present invention relates to an apparatus for loosening an electrode tip at the time of removing the electrode tip from an electrode.

2. Discussion of the Background

There is a necessity to remove an electrode tip from a tip end of an electrode for the replacement with a new electrode tip, after the electrode tip has been worn out or damaged. The removal of the electrode tip provided on the electrode by the press-fitting of the electrode tip onto the electrode with the tapered tip end, or the threaded engagement is conventionally performed by engaging a tool such as a spanner to a cut-out portion formed on the electrode tip of a cylindrical shape, and slightly rotating and loosening the electrode tip with regard to the electrode via the spanner. However, this operation is time-consuming and troublesome.

It is an object of the present invention to provide an apparatus, which is capable of loosening the electrode tip in simple and instant manner.

SUMMARY OF THE INVENTION

According to one aspect of the present invention, there is provided an apparatus for loosening an electrode tip, which comprises a clamping means mounted to a casing for clamping the electrode tip, the clamping means defining a through-hole for receiving the electrode tip to be loosened, and a driving means for driving the clamping means to allow the through-hole to expand and contract, thereby timely clamping and loosening the electrode tip positioned within the through-hole.

With the apparatus of the above arrangement, the loosening of the electrode tip can easily and instantly be achieved merely by operating the driving means to clamp the electrode tip via the clamping means. The apparatus of this arrangement can be applied to a robotic operation, and eliminate the necessity to form any cutout portions on the electrode tip, to which a spanner or the like is engaged for loosening the electrode tip.

In accordance with another aspect of the invention, the clamping means is rotatable by a predetermined angle around the centerline of M—M of the throughhole, as clamping the electrode tip.

In accordance with another aspect of the invention, the clamping means includes a plurality of clamping members, each of which is rotatable both directions around a corresponding shaft of each clamping member by means of the driving means. On a peripheral surface of each clamping member is formed a cam which defines the through-hole in cooperation with the other cams. The inscribed circle diameter defined by the cams is set in such a manner as to become larger than the outer diameter of the electrode tip at the time of that the diametrally smaller portion of each cam faces the center line of M—M, and become smaller than the outer diameter of the electrode tip at the time of that the diametrally larger portion of each cam faces the center line of M—M. With this arrangement, it is possible to clamp and loosen the electrode tip of varying size by properly setting the lift of the cam.

In accordance with another aspect of the invention, the clamping members are preferably mounted to a main wheel of an annulus ring shape rotatably supported on the casing. Rotating the main wheel via the driving means causes each clamping member to travel along the main wheel around the centerline of M—M as rotating around the corresponding shaft thereof. With this arrangement, the electrode tip for spot welding can be clamped and subsequently loosened by rotating the main wheel.

The clamping members are respectively and preferably formed of gears, so that teeth of the cams can bite into the electrode tip, thereby securely clamping and loosening the tip.

In accordance with another aspect of the invention, the apparatus includes the clamping means including at least two epicyclic gears being respectively and rotatably mounted to a main wheel of an annulus ring shape via corresponding pins; a torque transmitting mechanism for transmitting torque effected by the driving means to the main wheel to rotate the main wheel in both directions; an internal gear of an annular shape being disposed concentrically with the main wheel with centerline of M—M as a center of the internal gear and meshed with the epicyclic gears so that the epicyclic gears travel along the internal gear around the centerline of M—M as rotating around the pins mounted on the main wheel by the torque of the driving means; cams being respectively provided on peripheral surfaces of the epicyclic gears to define the through-hole, into which the electrode tip is inserted; each of the cams including a diametrally smaller portion and a diametrally larger portion so that the inscribed circle diameter defined by the cams become larger than the outer diameter of the electrode tip at the time of that the diametrally smaller portion of each cam faces the center line of M—M, and become smaller than the outer diameter of the electrode tip at the time of that the diametrally larger portion of each cam faces the center line of M—M.

With the apparatus of the above arrangement, the electrode tip is clamped at two or more points by the epicyclic gears. Specifically, each epicyclic gear is rotated so that the diametrally larger portion thereof becomes closer to the electrode tip and abuts against the same at a predetermined point. Since two or more cams are synchronized with each other, all the cams can simultaneously abut against the electrode tip at two or more points so that the electrode tip can securely be clamped and loosened by the two cams.

In accordance with another aspect of the invention, the casing is preferably movable via a moving means in such a direction as to remove the electrode tip from the electrode, as the clamping means clamps the electrode tip. With this arrangement, the electrode tip can more securely be removed from the electrode.

In accordance with another aspect of the invention, the casing is preferably movable via a moving means in a direction to remove the electrode tip from the electrode, as the diametrally larger portions of the cams clamp the electrode tip.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENT

Embodiment 1

Figure 1:
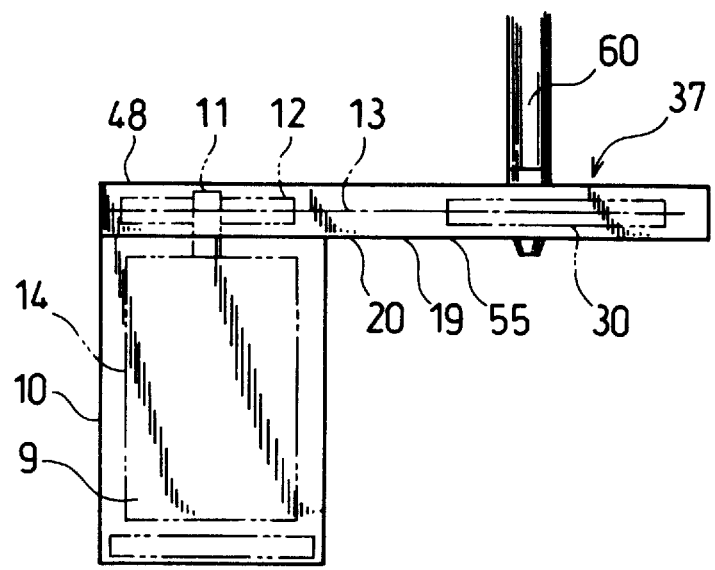
FIG. 1 is a general schematic front view of an apparatus for loosening an electrode tip in accordance with a first embodiment of the present invention.
Figure 2:
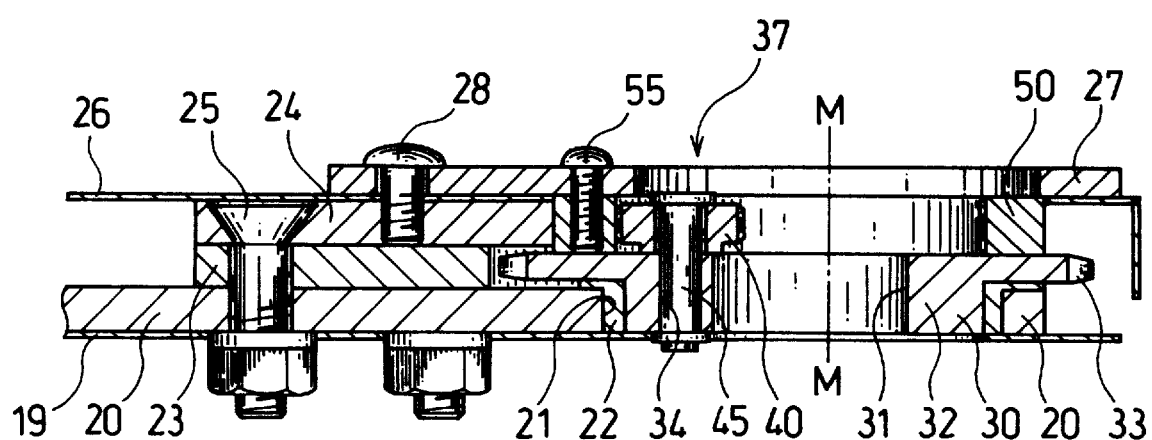
FIG. 2 is a front view with a partially longitudinal cross section of the apparatus of FIG. 1.
Figure 3:
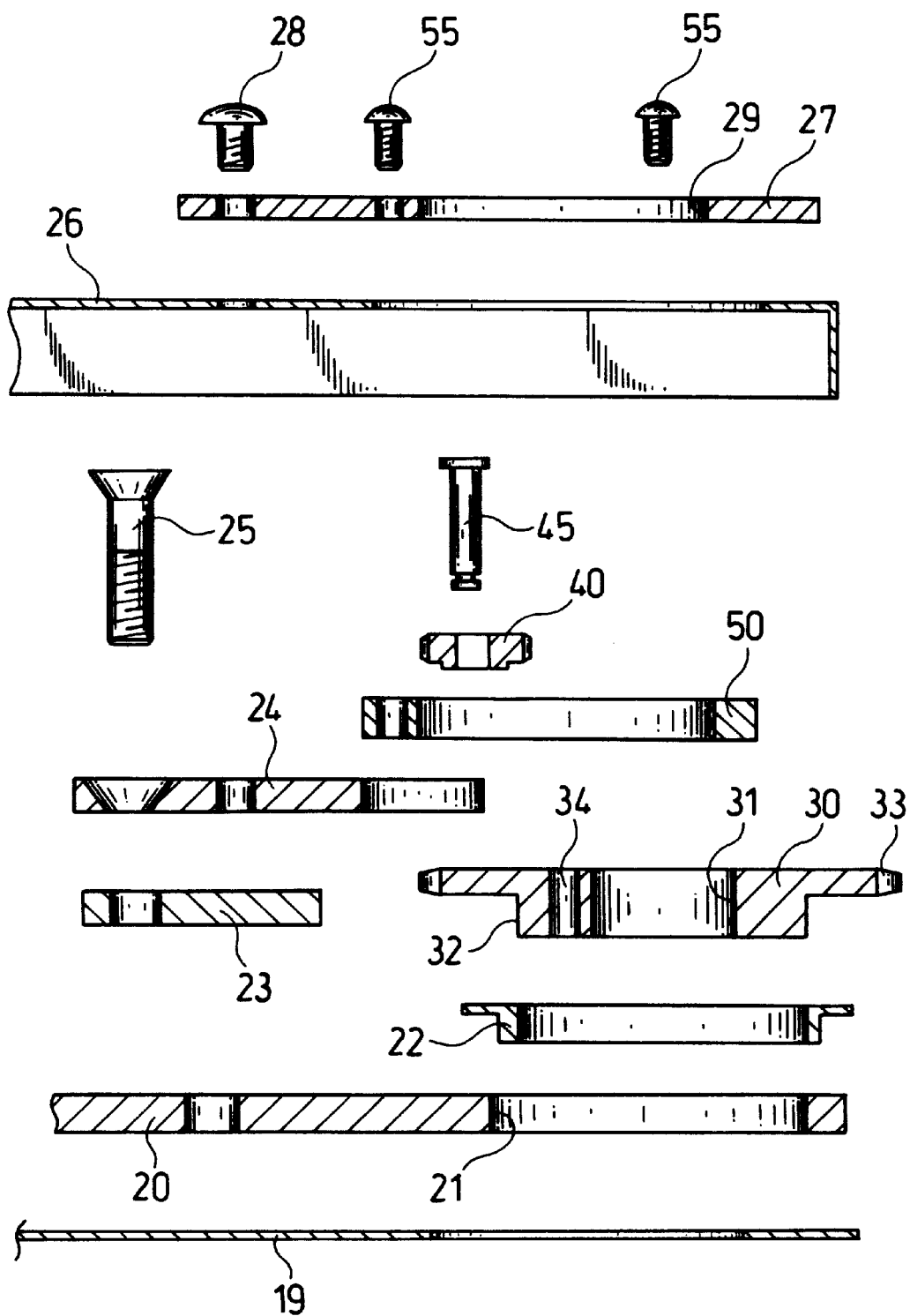
FIG. 3 is a cross section with a partial exploded view of the apparatus of FIG. 2.
Figure 4:
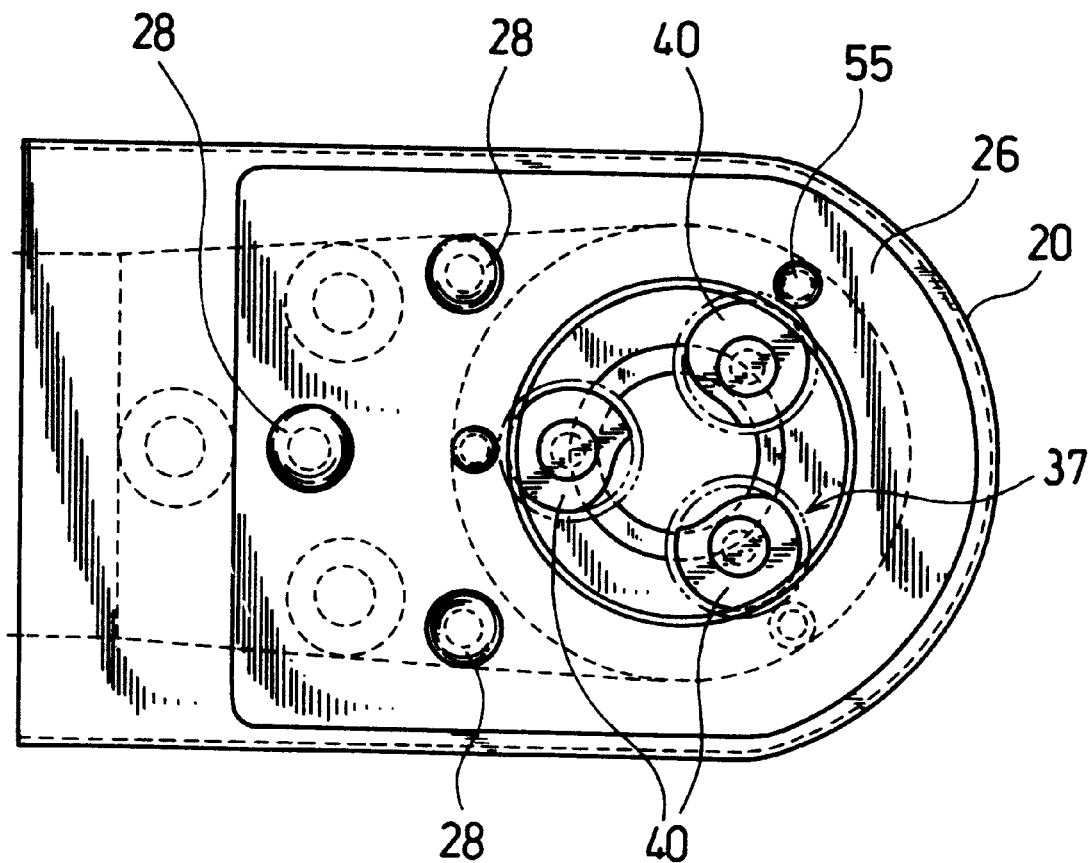
FIG. 4 is a plan view of the apparatus of FIG. 2.
Figure 5:
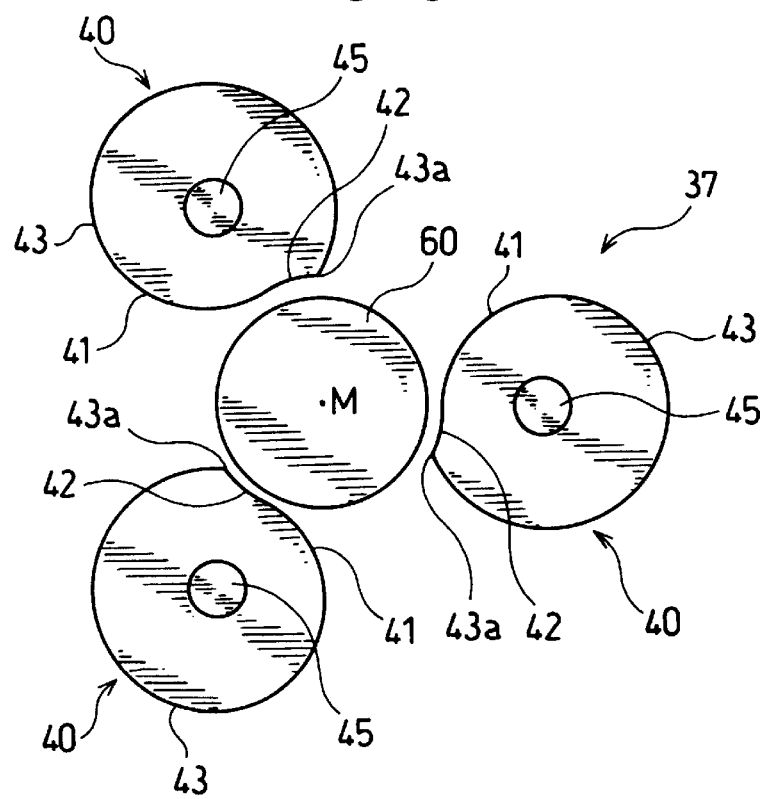
FIG. 5 is a plan view of the apparatus, illustrating the state where diametrally smaller portions of cams face a centerline.
Figure 6:
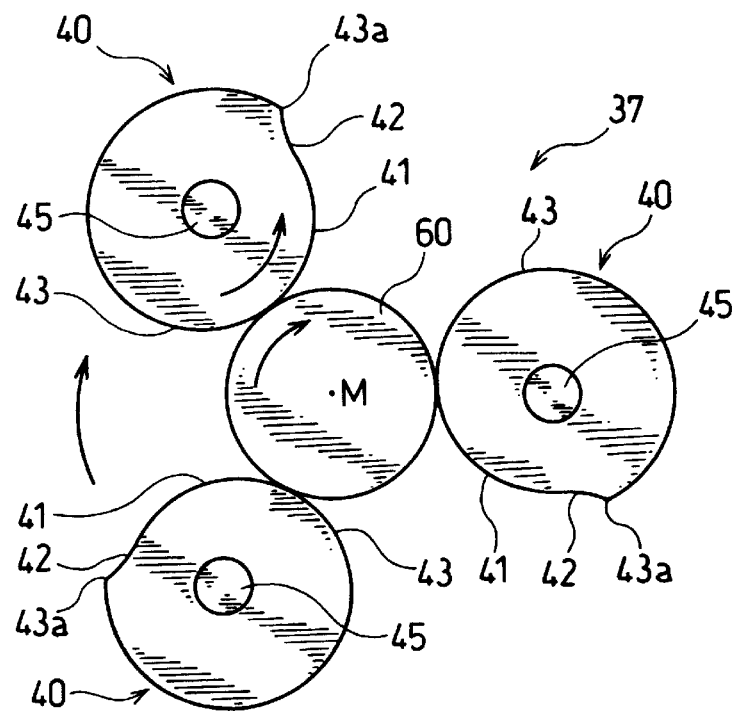
FIG. 6 is a plan view of the apparatus, illustrating the state where diametrally larger portions of the cams face the centerline.

FIGS. 1 to 6 illustrate a first embodiment of the present invention. A motor 9 with a motor shaft 11 is mounted within a motor case 10. A horizontally extending base plate 20 with a lower surface covered with a lower plate 19 is fixed on the motor case 10 closer to the motor shaft 11.

At a tip end of the base plate 20 is defined a bearing hole 21 with a centerline of M—M as a center thereof A main wheel 30 defines a center hole 31 concentrically aligned with the bearing hole 21, and includes a boss 32 which is horizontally disposed and rotatably fitted into the bearing hole 21 from above via a bearing 22 made of metal.

On the boss 32 of the main wheel 30 are mounted three epicyclic gears 40. These epicyclic gears 40 act as a clamping means in cooperation with each other for clamping a given electrode tip 60 to be removed from an electrode, and each epicyclic gear corresponds to a clamping member. The epicyclic gears 40 each have a cam 41, and are rotatably mounted on the boss 32 of the main wheel 30 via equidistantly disposed pins 45 which are inserted into through-holes 34 equidistantly defined in the boss 32. Each diametrally larger portion 43 is formed in such a manner as to gradually increase its diameter as it advances towards its terminal 43a in this embodiment. However, the diametrally larger portion 43 may be varied in diameter, for example, it may be formed with a uniform diameter in its entire length.

Cutting a teeth portion around the peripheral surface of the epicyclic gear 40 by an area of less than a half thereof forms the cam 41 of each epicyclic gear 40.

Each cam 41 is dimensioned so that the inscribed circle diameter defined by all the cams 41 becomes larger than the outer diameter of the electrode tip 60 at the time of that a diametrally smaller portion 42 of each cam 41 faces the centerline of M—M, and becomes smaller than the outer diameter of the electrode tip 60 at the time of that a diametrally larger portion 43 faces the centerline of M—M. The cams 41 of the epicyclic gears 40 define a through-hole for receiving the electrode tip 60.

In the above arrangement, the peripheral surface of each epicyclic gear 40 is cut by an area of less than a half thereof in order to obtain an area of the teeth portion large enough to sufficiently rotating the epicyclic gear 40.

In this embodiment, the clamping means for clamping the electrode tip 60 is formed by three epicyclic gears 40 as the clamping members. It is a matter of course that the number of the epicyclic gears 40 is not limited to three. Two or more than three epicyclic gears 40 can be employed. However, three epicyclic gears 40 may be more effective when considered to securely clamp the electrode tip by less numbers of the clamping members.

On the base plate 20 closer to a teeth portion 33 of the main wheel 30 is mounted an intermediate plate 23 thicker than the teeth portion 33. The intermediate plate 23 and an upper plate 24 mounted thereon are secured to the base plate 20 via a clamping bolt 25 with a flush head passing through the intermediate plate 23.

An upper plate 27 having a lower surface, to which an internal gear 50 is secured via screws 55, is fixed to an upper plate 24 via screws 28 together with an upper cover 26 surrounding the base plate 20. The lower cover 19, the base plate 20 and the upper cover 26 make up the casing 48. In this arrangement, the internal gear 50 is meshed with the teeth portions of the diametrally larger portions 43 of the epicyclic gears 40.

A torque transmitting mechanism 13 is provided between a driving wheel 12 secured to the motor shaft 11 being reversibly rotatable and the main wheel 30.

The torque transmitting mechanism 13 is preferably a timing belt in this embodiment.

The operational steps in accordance with the above arrangement will be hereinafter described.

The epicyclic gears 40 are first set at an initial position where the iametrally smaller portions 42 of the cams 41 of the epicyclic gears 40 face the centerline of M—M, so that the through-hole for receiving the electrode tip 60 is larger than the outer diameter of the tip 60. The electrode tip 60 mounted to the electrode for spot welding is, then, inserted into the through-hole and the center hole 31 of the main wheel 30. The main wheel 30 is, then, rotated in one direction via the torque transmitting mechanism 13 by operating the motor 9, so that the pins 45 together with the main wheel 30 travel along the internal gear 50 around the centerline of M—M, and the epicyclic gears 40 are rotated around the corresponding pins 45 by the torque transmitted from the internal gear 50.

Rotating the epicyclic gears 40 causes the through-hole to become radially smaller. Specifically, each epicyclic gear 40 is rotated so that the diametrally larger portion 43 thereof moves towards the electrode tip 60 and abuts against the same at a predetermined point in the travel distance of the epicyclic gears 40. The epicyclic gears 40, then, clamp the electrode tip 60 by their diametrally larger portions 43. The main wheel 30 then rotates by a predetermined angle to cause the epicyclic gears 40 to travel around the centerline of M—M and rotate around the pins 45. At this moment, the epicyclic gears 40 clamp the electrode tip 60 by a force large enough to prevent the slippage over the surface of the electrode tip 60, and therefore a further rotation of the epicyclic gears 40 around the centerline of M—M causes the electrode tip 60 to be rotated and loosened. In this embodiment, the diametrally larger portion 43 of each epicyclic gear 40 is formed to gradually increase in diameter towards the corresponding terminal 43a, so that the clamping force applied to the electrode tip 60 is gradually increased as the diametrally portions 43 advance towards the respective terminals 43a.

The electrode tip 60 is, then, released from the clamped state by reversely rotating the motor 9 to bring the epicyclic gears 40 into the initial position where the diametrally smaller portions 42 of the epicyclic gears 40 face the centerline of M—M to enlarge the through-hole.

Embodiment 2

Figure 7:
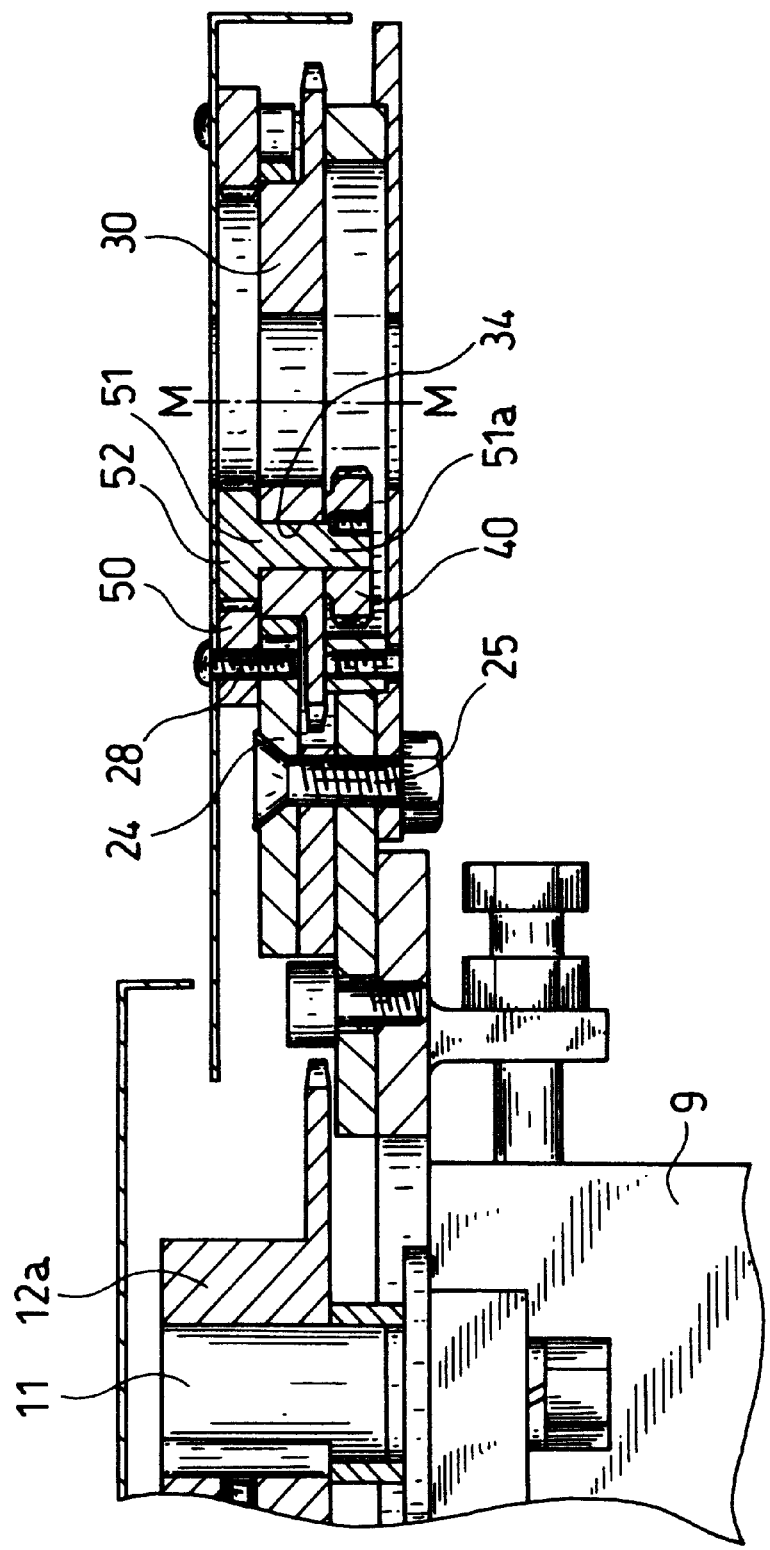
FIG. 7 is a front view with a partially longitudinal cross section of an apparatus for loosening an electrode tip in accordance with a second embodiment of the present invention.
Figure 8:
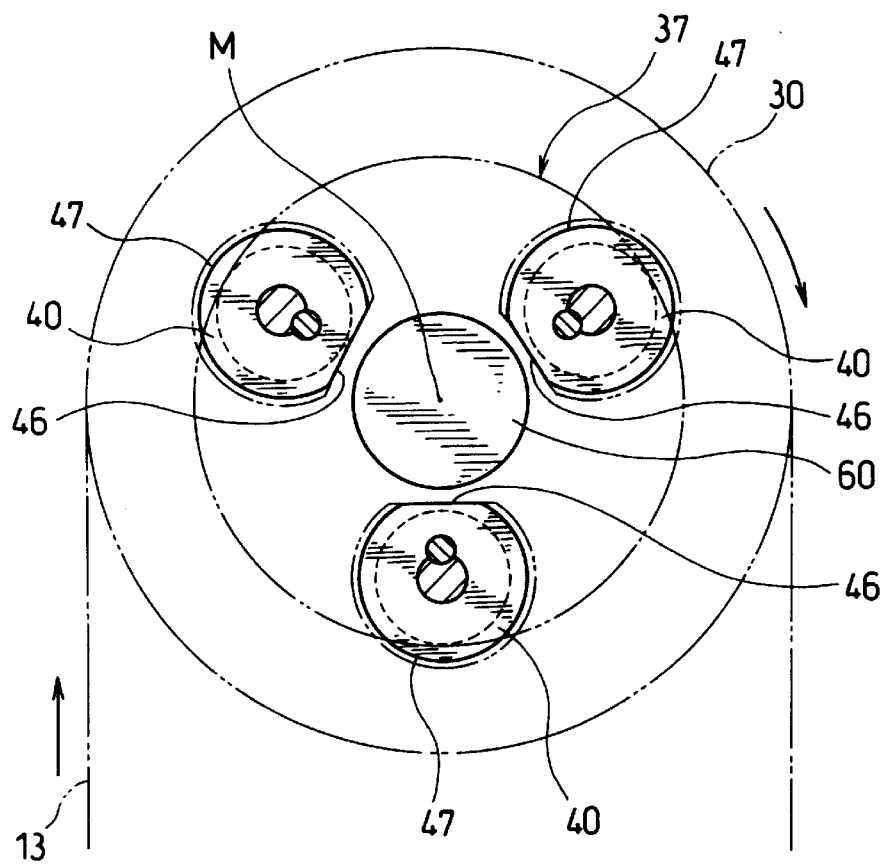
FIG. 8 is a plan view with a partial cross section illustrating the state where the diametrally smaller portions of the cams face the centerline.
Figure 9:
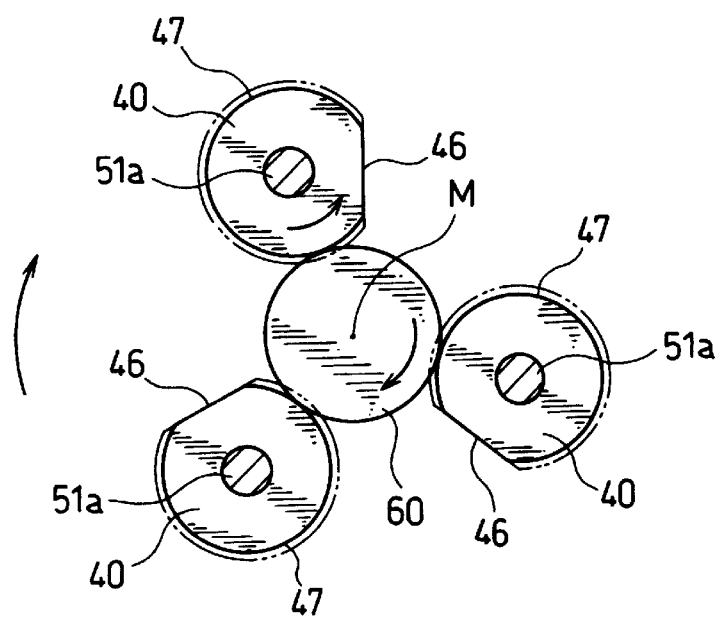
FIG. 9 is a plan view illustrating the state where the diametrally larger portions of the cams face the centerline.

FIGS. 7 to 9 illustrate a second embodiment of the present invention, in which the main wheel 30 is in the form of a sprocket. Specifically, the main wheel 30 and a sprocket 12a secured to the motor shaft 11 are connected via the torque transmitting mechanism 13 in the form of an endless chain 13 wound around therebetween to transmit the torque from the motor 9. Three spur gears 51, each having a spur gear portion 52 at the upper end thereof and a shaft 51a, are rotatably mounted within the corresponding through-holes 34 of the main wheel 30. The spur gear portions 52 of three spur gears 51 are meshed with the internal gear 50 secured to the upper plate 24 of the casing 48. The epicyclic gears 40 as the clamping members are respectively secured to the lower ends of the shafts 51a of the spur gears 51 in such a manner as to be integrally rotated with the corresponding spur gears 51.

As best shown in FIG. 8, each epicyclic gear 40 is cut away in a straight line to define a cutout portion 46 with a flat surface area. This cutout portion 46 corresponds to the diametrally smaller portion 42 of the cam of each epicyclic gear 40, and the circular portion other than the cutout portion 46 corresponds to the diametrally larger portion 43. The circular portion 47 is formed in such a manner as to have a uniform diameter in its entire length in this embodiment. However, the circular portion 47 may be formed in such a manner as to increase in diameter towards its terminal.

In this embodiment, the initial position of the epicyclic gears 40 is defined by the state where the cutout portion 46 of each epicyclic gear 40 faces the centerline of M—M. In this state, the through-hole defined by the cutout portions 46 becomes larger in diameter than the outer diameter of the electrode tip 60, so that the electrode tip 60 can be inserted into the thiough-hole.

The operational steps in accordance with the above arrangement will be hereinafter described.

Operating the motor 9 causes the main wheel 30 to be rotated via the endless chain 13. The spur gears 51, then, travel along the internal gear 50 around the centerline of M—M. In this state, the spur gear portions 52 of the spur gears 51 are meshed with the internal gear 50, so that the spur gears 51 are rotated around the respective shafts 51a. The epicyclic gears 40 at the initial position are simultaneously rotated around the shafts 51a and travel along the internal gear 50, so that the portion of each epicyclic gear 40 other than the cutout portion 46, that is, the portion with teeth thereon, is forced to bite into the electrode tip 60, as best shown in FIG. 9. Thus, the electrode tip 60 is clamped by the epicycle gears 40, and loosened via a slight rotation of the epicyclic gears 40 by a predetermined angle.

Embodiment 3

Figure 10:
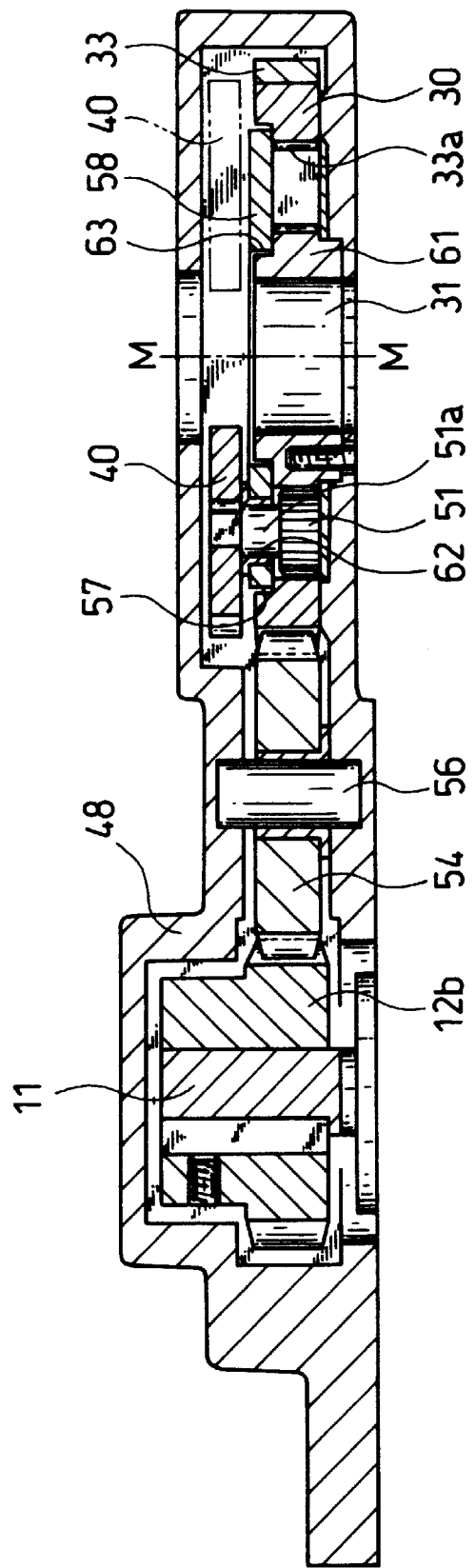
FIG. 10 is a front view with a partially longitudinal cross section of an apparatus for loosening an electrode tip in accordance with a third embodiment of the present invention.
Figure 11:
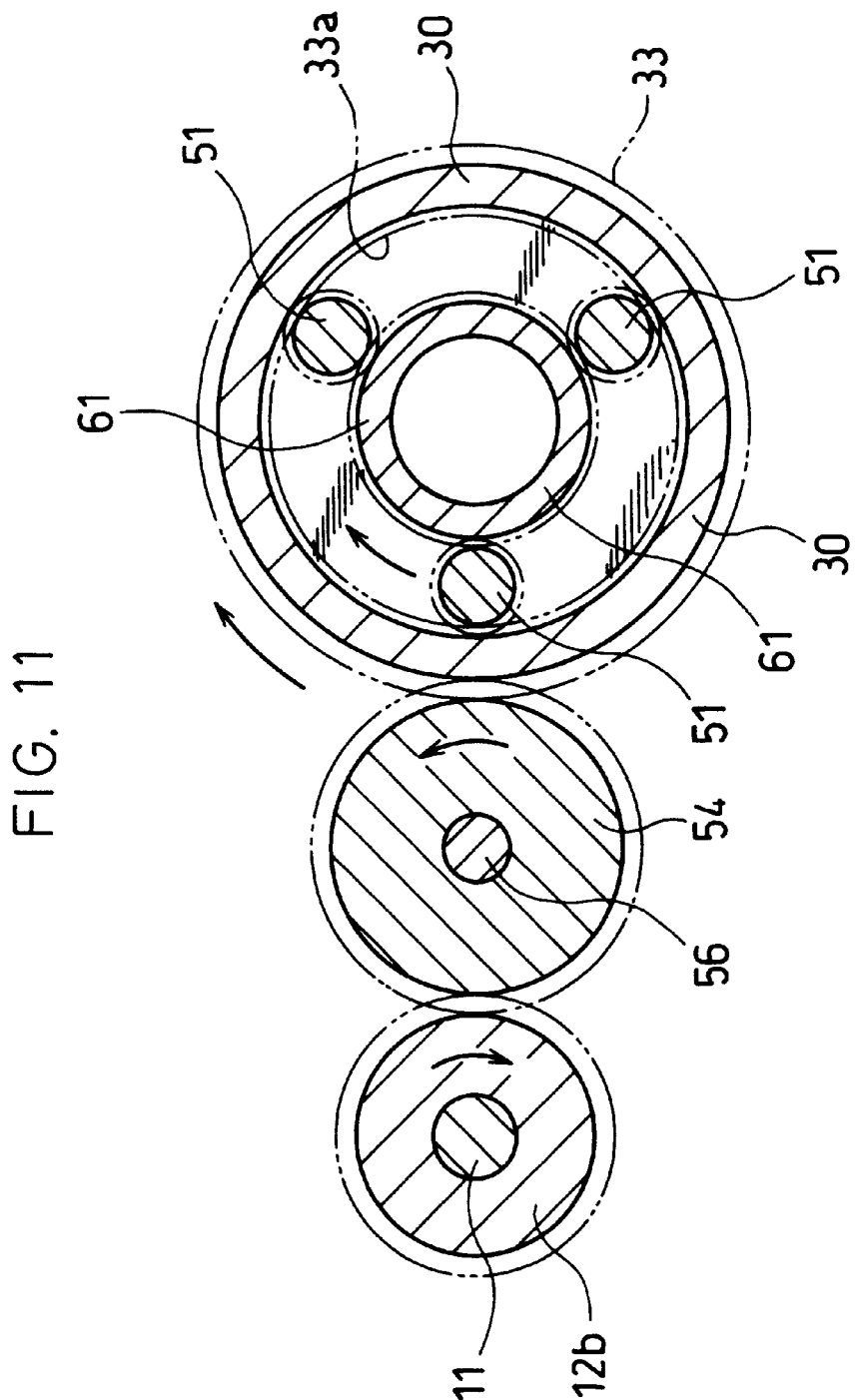
FIG. 11 is a schematic cross sectional front view of the apparatus illustrating the state where a clamping means for clamping the electrode tip is operated by gears.

FIGS. 10 to 11 illustrate a third embodiment of the present invention, in which the main wheel 30 in the form of a sun gear of an annulus ring shape is rotated by means of a gear mechanism. Specifically, an intermediate gear 54 is positioned between the sun gear 30 and a gear 12b secured to the motor shaft 11 of the motor 9 to transmit torque from the motor 9 to the main wheel 30.

The intermediate gear 54 is rotatably supported by a supporting shaft 56 secured to the casing 48 and vertically extending from the casing 48, and is meshed with both the gear 12b and the teeth portion 33 formed on a peripheral surface of the sun gear 30 as the main wheel. A plate 58 is relatively and rotatably fitted into an annular step portion 57 in order to support the sun gear 30 in a rotatable manner.

A stationary gear 61 defines a center hole 31 therein and secured to the casing 48 in such a manner as to be concentrically aligned with the sun gear 30. In an upper surface of the stationary gear 61 is defined an annular step portion 63, into which the plate 58 is relatively and rotatably fitted.

The shafts 51a of the spur gears 51 are rotatably supported by the plate 58 via a plurality of through-holes 62 defined in the plate 58. Each spur gear 51 is meshed with both a gear portion 33a defined on an inner periphery of the sun gear 30 and the stationary gear 61. The epicyclic gears 40 each having the same shape as that in the first and second embodiments are respectively secured to the upper ends of the spur gears 51.

In accordance with the above arrangement, operating the motor 9 causes the sun gear 30 to be rotated in the direction of arrow of FIG. 11 via the intermediate gear 54. Whereby, the spur gears 51 meshed with the sun gear 30, together with the plate 58 travel along the sun gear 30 around the centerline of MM, as rotating around the shaft 61a. Thus, the epicyclic gears 40 clamp and loosen the electrode tip 60 via its rotational motion.

Embodiment 4

Figure 12:
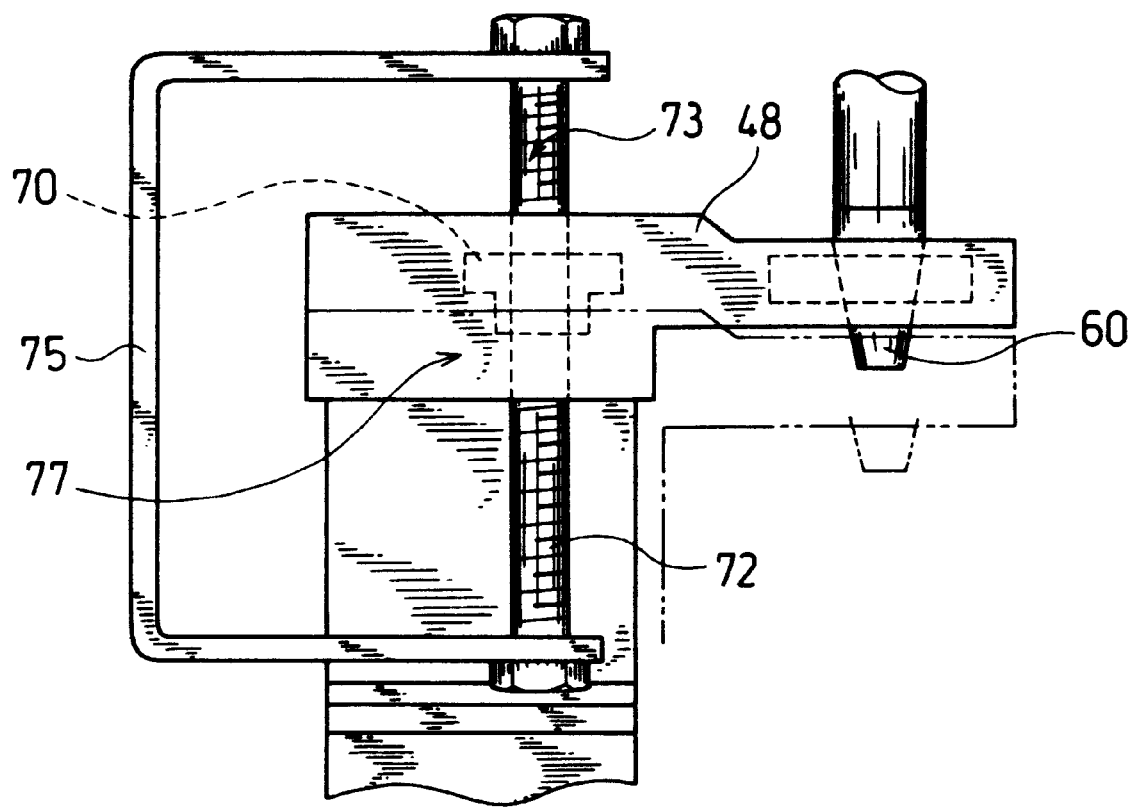
FIG. 12 is a general schematic front view of an apparatus for loosening an electrode tip in accordance with a second embodiment of the present invention.
Figure 13:
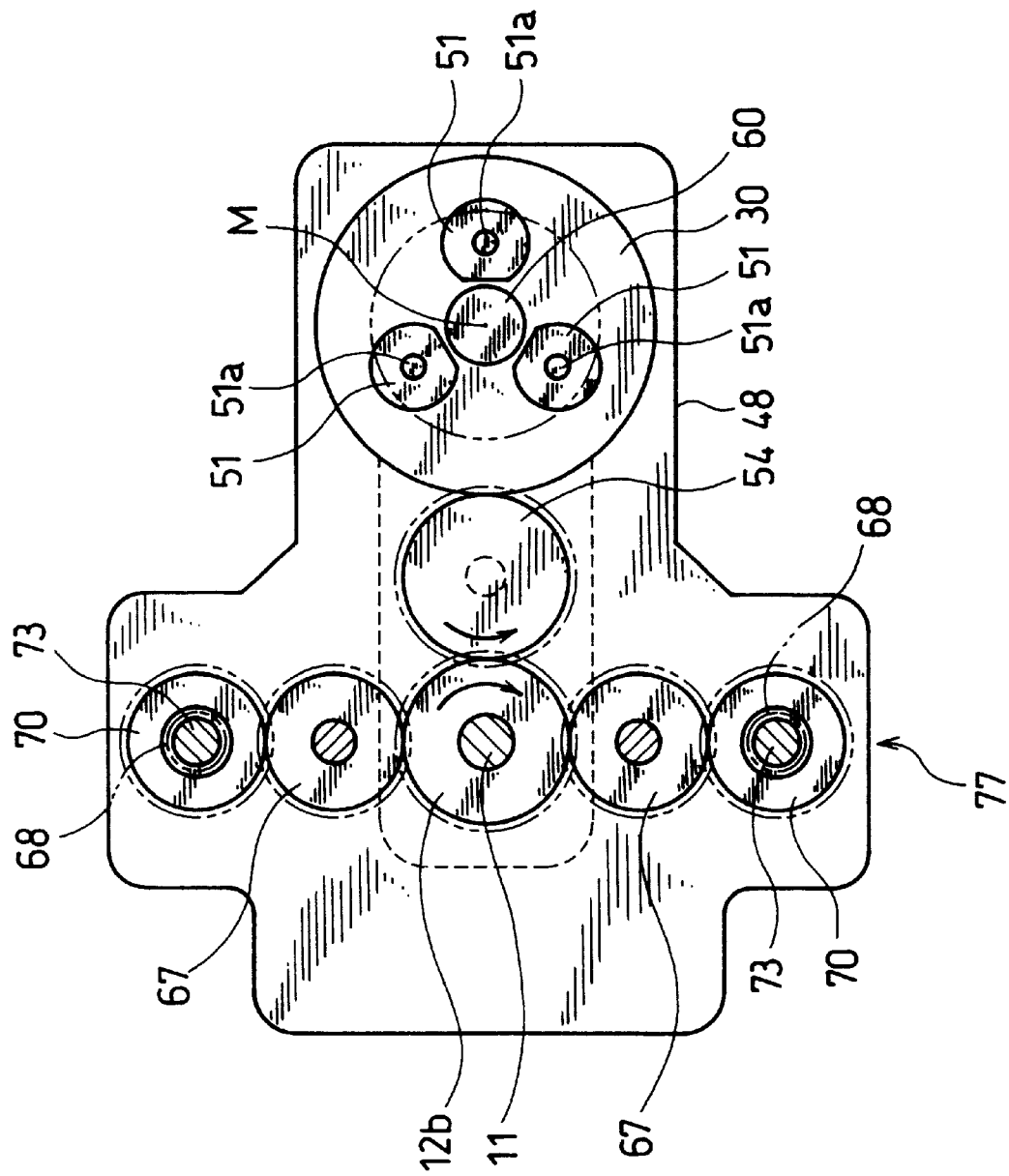
FIG. 13 is a schematic plan view with a partial cross section illustrating the apparatus of FIG. 12 having an arrangement to elevate a casing by gears in association with the clamping means.

FIGS. 12 and 13 illustrate a fourth embodiment of the present invention, in which the apparatus is provided with the casing 48 being movable upwardly and downwardly, as well as the clamping, rotating and loosening of the electrode tip 60 are carried out with the clamping means in the same manner as those of the aforementioned embodiments. The detailed arrangements of the clamping means will not be therefore discussed hereinafter, while some arrangements of the clamping means will be discussed. It is to be noted that the clamping means is not necessarily limited to the aforementioned arrangements, and various arrangements for clamping means are conceivable to be combined with the casing 48 being movable upwardly and downwardly.

Specifically, a pair of intermediate gears 67 are respectively meshed with the gear 12b positioned therebetween and secured to the motor shaft 11, and a pair of gears 70 for moving the casing 48 upwardly and downwardly are respectively positioned at lateral sides of the casing 48. Each gear 70 includes an inwardly threaded portion 68 to be meshed with an outwardly threaded portion 72 formed on a supporting rod 73 with a vertical axis. The supporting rod 73 is mounted at the upper and lower ends thereof to a bracket 75 secured to a portion of a fixed side of the apparatus. The gears 70 and the supporting rods 73 make up a moving means 77 for moving the casing 48 upwardly and downwardly.

In accordance with the above arrangement, the electrode tip 60 mounted on the electrode for spot welding is first inserted into the through-hole for receiving the tip. In this state, the motor 9 is operated, thereby causing the sun gear 30 to be rotated via the gear 12b secured to the motor shaft 11 and the intermediate gear 54. Whereby, the spur gears 51 meshed with the sun gear 30 travel along the sun gear 54 around the centerline of M—M, and rotate around the respective shafts 51a. The electrode tip 60 is then clamped and rotated by a predetermined angle to be loosened.

Operating the motor 9 also causes the gears 70 to be rotated via the intermediate gears 67 meshed with the gear 12b. The rotation of the gears 70 causes the casing 48 to be lowered along the supporting rods 73 via the meshing engagement between the inwardly threaded portions 68 of the gears 70 and the outwardly threaded portions 72 of the supporting rods 73. The electrode tip 60 is, thus, lowered along with the casing 48, and securely removed from the electrode.

In this regard, the electrode is held at position by hand or any conventional mechanism during the electrode tip 60 is lowered.

The electrode tip 60 mounted on the electrode may be inserted into the through-hole for receiving the electrode tip from below. In this arrangement, the casing 48 is configured to be elevated at the time of removing the electrode tip 60. The moving means 77 for moving the casing 48 may employ various arrangements, provided that the casing 48 can be moved in a direction to remove the electrode tip 60 at the same time as that clamping means 37 is operated in a direction to clamp the electrode tip 60.

The torque effected by the motor 9 may be transmitted to the moving means 77 via a gear train including the intermediate gears 67 and the intermediate gear 54 meshed with the gears 67.

It is also possible to provide the apparatus of the aforementioned embodiments with a torque releasing means for preventing torque from the driving means to be transmitted to the clamping means 37 at the time that the clamping means 37 applies a clamping force of more than a predetermined value over the electrode tip 60 so that the clamping means 37 can clamp the electrode tip 60 by a predetermined clamping force. With this sliding mechanism, the transmission of the torque of the motor 9 to the clamping means 37 is prevented so that the clamping force effected by the clamping means 37 is not increased, after it reaches a predetermined value, and the clamping means 37 continuously rotate the electrode tip 60 with regard to the electrode until it reaches a predetermined point in the travel distance of the clamping means 37. Therefore, the electrode tip can be securely loosened without receiving an excessive clamping force.

Figure 14:
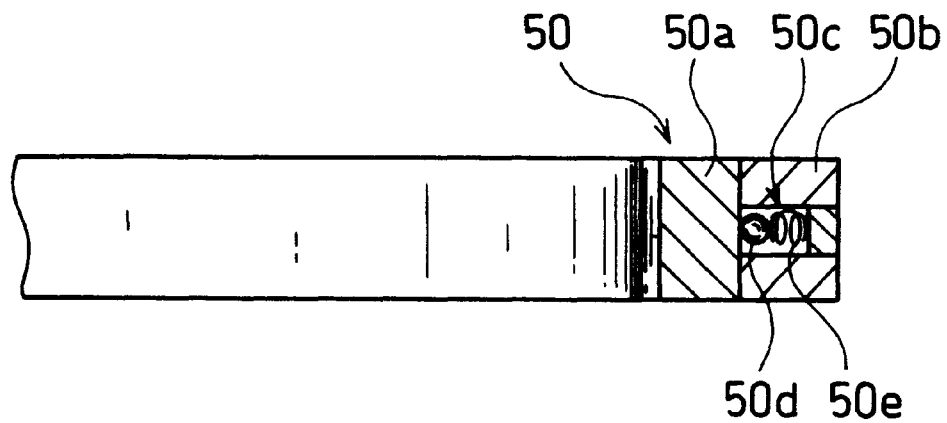
FIG. 14 is an enlarged cross section illustrating a sliding mechanism applied to the apparatus of the first embodiment.

FIG. 14 illustrates the sliding mechanism applied to the apparatus of the first embodiment, in which the internal gear 50 includes an inner annular member 50a to be meshed with the epicyclic gears 40 and an outer annular member 50b. A sliding mechanism 50c as the torque releasing means including a ball member 50d and a spring member 50e is provided between the inner and outer annular members 50a and 50b so that a predetermined pressure is applied to the inner annular member 50a to cause a predetermined frictional force to interlock the inner annular member 50a and the outer annular member 50b.

With the above arrangement, the epicyclic gears 40 travel along the internal gear 50 to a predetermined point in the travel distance of the epicyclic gears 40 and a torque of more than a predetermined value caused by a further rotation of the epicyclic gears 40 from the predetermined point in the travel distance of the epicyclic gears 40 and applied over the internal gear 50 causes the inner annular member 50a to slide over the outer annular member 50b via the sliding mechanism 50c. As a result, the rotation of the epicyclic gears 40 around the pins 45 is prevented after the epicyclic gears 40 reach the predetermined point so that an excessive clamping force is not applied over the electrode tip 60. Thus, rotating the electrode tip 60, as continuously claming the same by a predetermined clamping force can securely loosen the electrode tip 60.

Figure 15:
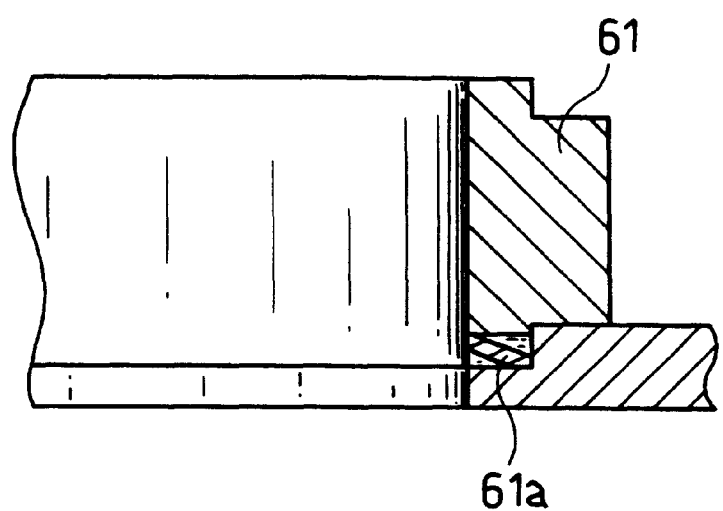
FIG. 15 is an enlarged cross section illustrating the sliding mechanism applied to the apparatus of the third embodiment.

FIG. 15 illustrates the sliding mechanism as the torque releasing means applied to the apparatus of the third embodiment. An initially coned disc spring 61a functioning as a part of the sliding mechanism is provided between the stationary gear 61 and the casing 48 to apply pressure over the stationary gear 61. With this arrangement, the stationary gear 61 slides over the casing 48 via the initially coned disc spring 61a after a torque of more than a predetermined value is applied over the stationary gear 61, so that the rotation of the epicyclic gears 40 around the shafts 51a of the spur gears 51 can be prevented, and therefore an excessive clamping force is not applied over the electrode tip 60. Thus, rotating the same with regard to the electrode under a predetermined clamping force can securely loosen the electrode tip 60.

It is a matter of course that various arrangements of the sliding mechanism can be employed, provided that the clamping means can rotate the electrode tip 60 with regard to the electrode, as clamping the same by a predetermined clamping force.

This specification is by no means intended to restrict the present invention to the preferred embodiments set forth therein. Various modifications to the apparatus for loosening the electrode tip for spot welding of the present invention, as described herein, may be made by those skilled in the art without departing from the spirit and scope of the present invention as defined in the appended claims.

What is claimed is:

1. An apparatus for loosening an electrode tip, comprising:

a clamping mechanism rotatable mounted to a casing for clamping the electrode tip, the clamping mechanism defining a through-hole for receiving the electrode tip to be loosened, said clamping mechanism including at least two clamping members, each of which is rotated in both directions around a corresponding rotational axis in response to a rotation of said clamping mechanism relative to said casing, each of said clamping members including a cam formed on a peripheral surface thereof to define the through-hole in cooperation with corresponding cams of another of said clamping members, each of the cams presenting a diametrally smaller portion and a diametrally larger portion along a circumference thereof, the cams being oriented relative one another such that an inscribed circle diameter defined by the cams is larger than the outer diameter of the electrode tip when the diametrally smaller portion of each cam faces a center line of M—M of the through hole, and is smaller than the outer diameter of the electrode tip when the diametrally larger portion of each cam faces said center line of M—M, a region of engagement of each of said cams with the electrode tip when clamped in said clamping mechanism being located proximal a straight locus extending between the corresponding rotational axis and the centerline of M—M of the through hole; and a drive source for selectively imparting rotation to the clamping mechanism relative to the casing.

2. An apparatus as set forth in claim 1, wherein the clamping mechanism is rotatable by a predetermined angle around the centerline of M—M of the through-hole, as clamping the electrode tip.

3. An apparatus as set forth in claim 1, wherein the clamping members are mounted to a main wheel of an annulus ring shape rotatably supported on the casing, so that the clamping members travel along the main wheel around the centerline of M—M as rotating around the corresponding rotational axis thereof by rotating the main wheel by the drive source.

4. An apparatus for loosening an electrode tip, comprising:

claming means mounted to a casino for clamping the electrode tip, the clamping means defining a through-hole for receiving the electrode tip to be loosened;

driving means for driving the clamping means to allow the through-hole to expand and contract, thereby timely clamping and loosening the electrode tip positioned within the through-hole;

the clamping means including clamping members, each of which is rotatable in both directions around a corresponding shaft of each clamping member by means of the driving means;

a cam formed on a peripheral surface of each clamping member to define the through-hole in cooperation with the other cams, in which the inscribed circle diameter defined by the cams is set in such a manner as to become larger than the outer diameter of the electrode tip at the time of that the diametrally smaller portion of each cam faces the center line of M—M, and become smaller than the outer diameter of the electrode tip at the time of that the diametrally larger portion of each cam faces the center line of M—M; and each of the clamping members being formed of a gear.

5. An apparatus for loosening an electrode tip, comprising:

clamping means mounted to a casing for clamping the electrode tip, the clamping means defining a through-hole for receiving the electrode tip to be loosened;

driving means for driving the clamping means to allow the through-hole to expand and contract, thereby timely clamping and loosening the electrode tip positioned within the through-hole;

the clamping means including at least two epicyclic gears being respectively and rotatably mounted to a main wheel of an annulus ring shape via corresponding pins, a torque transmitting mechanism for transmitting torque effected by the driving means to the main wheel to rotate the main wheel in both directions;

an internal gear of an annular shape being disposed concentrically with the main wheel with centerline of M—M as a center of the internal gear and meshed with the epicyclic gears so that the epicyclic gears travel along the internal gear around the centerline of M—M as rotating around the pins mounted on the main wheel by the torque of the driving means; and cams being respectively provided on peripheral surfaces of the epicyclic gears to define the through-hole, into which the electrode tip is inserted, each of the cams including a diametrally smaller portion and a diametrally larger portion so that the inscribed circle diameter defined by the cams become larger than the outer diameter of the electrode tip at the time of that the diametrally smaller portion of each cam faces the center line of M—M, and become smaller than the outer diameter of the electrode tip at the time of that the diametrally larger portion of each cam faces the center line of M—M.

6. An apparatus as set forth in claim 5, wherein the cam of each of the epicyclic gears occupy an area of less than a half of the peripheral surface of each of the epicyclic gears.

7. An apparatus as set forth in claim 1, wherein the casing is movable in such a direction as to remove the electrode tip from the electrode, as the clamping mechanism clamps the electrode tip.

8. An apparatus for loosening an electrode tip, comprising:

clamping means mounted to a casing for clamping the electrode tip, the clamping means defining a through-hole for receiving the electrode tip to be loosened;

driving means for driving the clamping means to allow the through-hole to expand and contract, thereby timely clamping and loosening the electrode tip positioned within the through-hole; and torque releasing means for preventing torque from the driving means to be transmitted to the clamping means at the time that the clamping means applies a clamping force of more than a predetermined value over the electrode tip so that the clamping means can clamp the electrode tip by a predetermined clamping force.

9. An apparatus as set forth in claim 5, further comprising a torque releasing means for preventing the torque effected by the driving means to be transmitted to the clamping means at the time that the clamping means applies a clamping force of more than a predetermined value over the electrode tip so that the clamping means can clamp the electrode tip by a predetermined clamping force.

10. An apparatus as set forth in claim 9, wherein the internal gear includes an inner annular member to be meshed with the epicyclic gears and an outer annular member, the torque releasing means being provided between the inner and outer annular members for applying a predetermined pressure to the inner annular member to cause a predetermined frictional force to interlock the inner annular member and the outer annular member and to prevent torque from the driving means to be transmitted to the clamping means at the time that the clamping means applies a clamping force of more than a predetermined value over the electrode tip so that the clamping means can clamp the electrode tip by a predetermined clamping force.

11. An apparatus for loosening an electrode tip, comprising:

a casing;

a clamping mechanism mounted to the casing for clamping the electrode tip;

a drive source for driving said clamping mechanism; and said clamping mechanism including clamping members respectively forming cams on peripheral surfaces thereof having a diametrally larger portion, a diametrally smaller portion and a transitional portion advancing from said diametrally larger portion to said diametrally smaller portion in such a manner as to be gradually decreased in diameter, said cams being respectively supported by shafts to define a through hole with a center line of M—M between said clamping members and synchronously rotatable around said shafts in both direction by said drive source in such manner as to vary the diameter of said through hole, an inscribed circle diameter defined by the cams being set in such a manner as to become larger than an outer diameter of the electrode tip when the diametrally smaller portion of each cam faces the center line of M—M, and to become smaller than the outer diameter of the electrode tip when the diametrally larger portion of each cam faces the center line of M—M.

12. An apparatus as set forth in claim 11, wherein a number of said clamping members provided is three.

13. An apparatus as set forth in claim 11, further comprising a torque release mechanism for preventing torque from the drive source to be transmitted to the clamping mechanism when the clamping mechanism applies a clamping force of more than a predetermined value over the electrode tip, such that the clamping mechanism can clamp the electrode tip by a predetermined clamping force.

* * * * *